April 29, 1969 R. EPPE 3,441,884

LAMINATED MAGNETIC HEAD FOR EFFECTING CHECKERBOARD PATTERN MAGNETIZATION OF A MAGNETIC MATERIAL

Filed May 11, 1966

INVENTOR.
RUDOLF EPPE

BY

Michael S. Striker
Atty

United States Patent Office 3,441,884
Patented Apr. 29, 1969

3,441,884

LAMINATED MAGNETIC HEAD FOR EFFECTING CHECKERBOARD PATTERN MAGNETIZATION OF A MAGNETIC MATERIAL

Rudolf Eppe, Taufkirchen, Munich, Germany, assignor to Agfa-Gevaert Aktiengesellschaft, Leverkusen, Germany Filed May 11, 1966, Ser. No. 549,272
Claims priority, application Germany, May 21, 1965, A 49,275
Int. Cl. H01f *13/00*
U.S. Cl. 335—284 2 Claims

ABSTRACT OF THE DISCLOSURE

A magnetizing apparatus has a pole piece including a row of pairs of pole shoes of opposite polarity producing magnetic areas of alternate polarity, along a sharp edge of the pole piece. A magnetizable element is transported transverse to the edge while the pole piece is energized to have an alternate polarity so that along the edge magnetic areas of alternate polarity are created in the magnetizable element in the direction of relative movement whereby a checkerboard pattern of magnetized areas of opposite polarity is produced.

The present invention relates to a magnetizing apparatus for forming a pattern of alternate polarity on a magnetizable element, such as a record carrier.

The force acting in a magnetic field on a ferromagnetic particle, is the product of field density and of the gradient of the magnetic field. In the event that a record carrier having a large surface is uniformly magnetized, its effect on a ferromagnetic particle is comparatively small, even at very high magnetization because the gradient is small due to the uniform magnetization.

To overcome this disadvantage, particularly noticeable in magnetic printing methods, it has been proposed to provide a magnetizable record carrier with a magnetization pattern in which adjacent spots of the surface of the record carrier have opposite magnetic polarity.

In one prior art construction, small permanent magnets displaced relative to each other 180°, or small electromagnets through which current flows in opposite directions, are combined in a grid which is superimposed on the record carrier to be magnetized so that the pattern of magnetization is transferred to the same. If necessary, a uniform, or selective, for example corresponding to an image, thermic perfectioning of the record carrier is carried out.

In another construction of the prior art, circular spots of a magnetizable record carrier are magnetized by a row of individually excitable magnetic heads which are formed by two concentric parts so that each magnetized spot of the record carrier has a center of one polarity surrounded by an annular area of the opposite polarity. With magnetic heads constructed in this manner, it is very difficult to obtain over a large surface sufficiently small magnetized spots to obtain a well defined image if the record carrier is used for a magnetic printing process.

It is one object of the invention to overcome the disadvantages of known apparatus for forming a magnetic pattern on a magnetizable element, and to provide a magnetizing apparatus of simple construction capable of forming a pattern of alternate polarity on a large surface of a magnetizable element, such as a record carrier.

Another object of the invention is to form extremely small areas of alternate polarity on the surface of a magnetizable element.

Another object of the invention is to form alternate areas of opposite magnetic polarity on a magnetizable element by moving the same and an alternating magnetic field relative to each other.

Another object of the invention is to form alternate areas of opposite polarity on a magnetizable element by moving the same at a constant speed past the sharp edge of the pole piece of an electromagnet excited by alternating current having a frequency related to the speed of movement of the magnetizable element.

Another object of the invention is to produce a checkerboard pattern of small areas of opposite magnetic polarity on a magnetizable element.

With these objects in view, the present invention provides a magnetizing apparatus for forming a pattern of alternate polarity on a magnetizable element, such as a record carrier of the type used for magnetic printing.

One embodiment of the invention comprises a magnetizing element, such as an electromagnet having a pole piece with a tapered tip; supporting means for supporting a magnetizable element, such as a record carrier plate, in the proximity of the tip; energizing means, such as a source of alternating current connected with a winding of the magnetic head for producing an alternating magnetic polarity in the pole piece at a predetermined frequency so that an alternating magnetic flux flows from said tip into said magnetizable element; and transporting means for moving one of the above-mentioned element, preferably the record carrier plate, in one direction relative to the other element, preferably the magnetic head, at a speed which depends on the frequency of the energizing current.

The speed of relative movement is selected so that at each change of the polarity of the magnetic head and its pole piece, a different area of the magnetizable element is located in the region of the tip of the pole piece and is permeated by the magnetic flux and magnetized. Since successive areas of the magnetizable element are permeated by opposite magnetic fluxes, magnetic areas of alternate polarity are created in the magnetizable element.

In the preferred embodiment of the invention, the pole piece includes a set of pairs of pole shoes arranged in a row transverse to the direction of relative movement, and the pole shoes of each pair create adjacent magnetic fluxes passing through areas of the magnetizable element adjacent in the direction transverse to the direction of relative movement, and create in the magnetizable element a row of magnetic areas whose polarities alternate in the transverse direction.

In this manner, a substantially checkerboard pattern of oppositely magnetized areas is formed in the magnetizable element, particularly if the thickness of the pole shoes and the spacing between the same in the transverse direction is selected so that the dimensions of the magnetized areas of the magnetizable element are substantially the same in the direction of relative movement and in the direction transverse thereto.

In accordance with the invention, the tip, or the row of transversely aligned tips of the pole shoes form a sharp transverse edge which permits the creation of areas of alternate magnetic polarity in the magnetizable carrier of practically any desired small dimensions, resulting in a corresponding high degree of definition of an image formed on the magnetizable element when the same serves as a magnetic record carrier in a magnetic printing process.

Between adjacent magnetized areas of opposite polarity of the magnetizable element, a strong inhomogeneous magnetic field is formed which has a high field gradient, although it has only a small effective range. Small ferromagnetic particles, which are placed close to the magnetized surface, are attracted with comparatively high forces, which are particularly great if the particles form a bridge between adjacent areas of different polarity, and increase the induction considerably. If a record carrier premagnetized in this manner is subjected to heat radiation representing an image so that the temperature is raised above the Curie point of the permanently magnetizable components thereof, the irradiated portions are demagnetized, while the remaining portions retain with comparatively great force, a magnetic pigment in the form of a powder, a dispersion, or a magnetic printing ink. The colored or inked magnetic image can then be either fixed on the record carrier, or printed on a copy carrier, such as a paper sheet. Any number of copy sheets can be printed when the magnetic inking is repeated.

In the preferred embodiment of the invention, pairs of slanted pole shoes cross each other to form the tip of the pole piece. The pole shoes are formed of thin magnetizable metal sheets which are reduced toward the tip of the pole piece so that the inner edges of the pole shoes of each pair form an angle of at least 60°. The reduction of the cross-sections of the pole shoe sheets towards the tip results in an increase of the magnetic flux density, which favorably influences the entry of the magnetic flux into the magnetizable record carrier, particularly if the saturation magnetization of the pole shoe material is exceeded in the region of the tip and its sharp transverse edge. Due to the pronounced spread, stray flux within the stack of pole shoe sheets is suppressed to a great extent.

While the pole shoe sheets consist of highly magnetic permeable material, such as soft iron, they are preferably separated by sheets consisting of a non-magnetic material, such as beryllium bronze. A magnetic short circuit between the pole shoes is prevented by opposed magnetic fields produced by eddy currents in the beryllium sheets, so that a comparatively great part of the magnetic force lines is directed into the surface of the magnetizable record carrier. Beryllium is preferred due to its high conductivity which results in strong eddy currents, and due to its hardness which compares with the hardness of soft iron so that the magnetizing edge at the tip of the pole piece can be ground without a burr when a pole piece stack of soft iron and beryllium sheets has been assembled.

In the preferred embodiment of the invention, the magnetizable pole shoe sheets and the nonmagnetizable separating beryllium sheets have a thickness of less than 0.1 mm., preferably 0.02 to 0.04 mm., so that adjacent magnetized areas of the record carrier are spaced distances of less than 0.2 mm., and preferably of 0.04 to 0.08 mm. in the transverse direction of the sharp edge forming the tip of the pole piece.

The wider spacing of 0.08 mm. is entirely sufficient for the reproduction of typewritten pages, while the narrower spacing of 0.04 mm., which can be obtained in accordance with the present invention without particular difficulty, is suitable for printed reproductions of very fine definition.

Assuming that the winding of the magnetic head is excited by an alternating current of 50 Hz., magnetizing periods between 15 and 75 seconds are required for a DIN A4 page moving longitudinally through the magnetizing apparatus, assuming that the magnetized areas are spaced the same distances in longitudinal and transverse directions corresponding to a checkerboard pattern. If a frequency converter is connected into the circuit of the magnetic head, the magnetizing time periods required for each area can be correspondingly shortened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
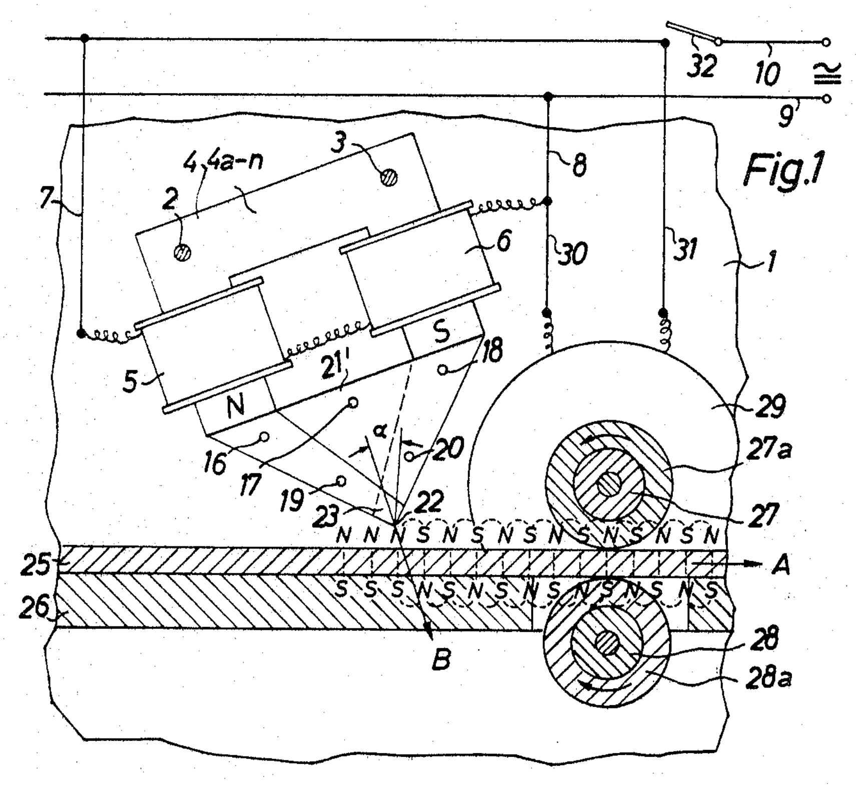
FIG. 1 is a fragmentary schematic elevation of one embodiment of the invention, partially in section and partially in the form of an electric circuit diagram.
Figure 2:
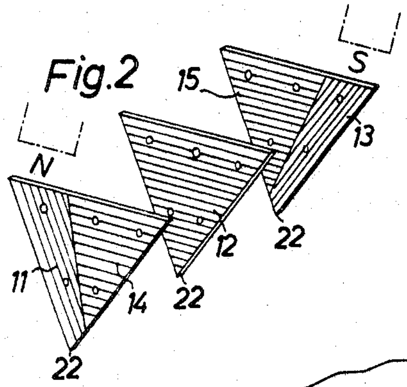
FIG. 2 is a fragmentary exploded perspective view illustrating the construction of a pole piece.

Referring now to the drawing, a U-shaped stack of magnetizable sheets 4*a* to 4*n* is secured to the walls 1 of a housing by transverse bolts 2 and 3. The legs of U-shaped core 4 carry magnet windings 5 and 6 which are connected in series to each other, and are also connected by conductors 7 and 8 to the main lines 9 and 10 of a source of alternating voltage. Windings 5 and 6 are wound in such a manner that one leg of core 4 is a north pole, and the other leg is a south pole during one phase of the alternating current, while the polarity is reversed during the following phase of the alternating current. The letters N and S indicate a momentary polarity of the core 4.

A pole piece 21' abuts the ends of the legs of core 4, and is constituted by a stack of differently shaped sheets 11*a* to 11*n*, 12*a* to 12*n*, 13*a* to 13*n*, 14*a* to 14*n* and 15*a* to 15*n*. Bolts 16 to 20 pass through bores in the sheets and secure the same to each other and to the housing walls 1. The transverse thickness of the stack of superimposed sheets is the same as the transverse thickness of the stack of sheets forming core 4.

Within stack 21', a highly permeable soft iron sheet 11 which is magnetically connected with the left leg of core 4, is separated by a nonpermeable sheet 12, consisting of beryllium bronze, from a sheet 13 which is magnetically connected with the right leg of core 4. The stack of sheets 11*a* to 11*n* constitutes one pole shoe, and the stack of sheets 13*a* to 13*n* constitutes the other pole shoe of the electromagnetic head. Pole shoe sheets 11 and 13 (as they will be referred to hereinafter for the sake of simplicity), are narrow and slanted to each other so that the inner edges thereof form an angle of at least 60°. The end portions of pole shoe sheets 11 and 13 overlap in a quadrilateral area 23, and each pole shoe piece has a tip 22. Between the pole shoe sheets 11 and 13 of each pair, a triangular separating sheet 12 consisting of beryllium bronze is interposed which has lateral edges slanted at the same angle as the outer lateral edges of the pole shoe sheets 11 and 13. The empty spaces between successive separating sheets 12*a*, 12*b*, which are spaced according to the thickness of pole shoe sheets 11 and 13, are filled with smaller triangular inserted beryllium bronze sheets 14 and 15 so that a solid stack 21' is formed which has two slanted faces intersecting in a row of tips 22 which form a sharp edge of pole piece 21'.

Inserted sheets 14 and 15, and the separating sheets 12 reduce the magnetic stray flux. Since pole shoe sheets 11 and 13, and inserted sheets 14 and 15 are mirror symmetric, they can be stamped out by the same tools.

Figure 3:
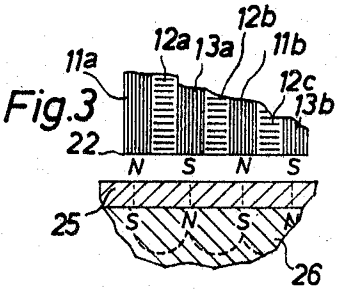
FIG. 3 is a fragmentary cross-sectional view taken along the line B in FIG. 1.

It is advantageous to grind a sharp edge 22 after the stack has been assembled and secured by bolts 16 to 20 passing through aligned holes in the several sheets. The magnetic head with pole piece 21', is supported by the bolts in a position in which the plane of symmetry passing through the edge 22 is slanted to a horizontal support table 26 on which a magnetizable element, shown to be a record carrier plate 25, is disposed for sliding movement in the direction of the arrow A. Supporting table 26 is preferably made of a highly magnetically permeable material, such as soft iron, so that the magnetic fluxes flowing between pole shoe sheets 11 and 13 flow through support plate 26, as shown in FIG. 3 which illustrates a first pair of pole shoe sheets 11*a*, 13*a*, and a second pair of pole shoe sheets 11*b*, 13*b*, separated by magnetically impermeable beryllium bronze sheets 12*a*, 12*b*, and 12*c*.

It will be understood that the polarity indicated by the letters N and S prevails only during one phase of the alternating current applied to the magnetic head, and that during the next following phase of the alternating current, the polarity will be reversed. As long as the magnetizing element 4, 5, 6, 21' and the magnetizable element 25 do not move relative to each other, the alternate polarity of the flux prevents the creation of magnetized areas in the magnetizable element 25.

A pair of transporting rollers 27 and 28 enveloped by rubber sleeves 27*a* and 28*a*, one of which is biassed toward the other by a spring, not shown, is provided for transporting the record carrier 25 in the direction of the arrow A. A synchronous motor 29 drives transporting rollers 27, 28, and is connected by lines 30 and 31 with the main lines 9 and 10 to receive alternating current at the same frequency as windings 5 and 6. A switch 32 simultaneously connects and disconects the windings 5 and 6 and synchronous motor 29 with voltage source.

When switch 32 is closed, motor 29 starts and transporting rollers 27, 28 transport the record carrier 25 in the direction A which is perpendicular to the direction of the sharp edge formed by the tips 22 of the pole piece 21'. The length of this edge, and the thickness of pole piece 21' corresponds to the width of record carrier 25 so that if the entire length of the record carrier is transported past the edge 22, the entire surface of record carrier 25 will be exposed to the magnetic flux between pole shoe sheets 11*a* to 11*n* and 13*a* to 13*n*. Assuming that during a first phase of the alternating current, magnetic fields as illustrated in FIG. 3 are formed, north poles and south poles will alternate across the record carrier 25 along the edge 22. When the phase of the alternating current changes, and the magnetic fields are reversed, record carrier 25 has been moved by transporting rollers 27, 28 rapidly enough so that the reversed magnetic fields do not extinguish the previously formed magnetic areas, but act along a transverse line of record carrier 25 to form on the same a transverse row of alternate areas of opposite polarity, and this magnetizing operation is continued until the entire record carrier is provided with a checkerboard pattern of magnetized areas of opposite magnetic polarity.

The required relative speed between the magnetizable elements 25 and the magnetizing element 4, 5, 6, 21' can be computed from the following equation:

$$S\left(\frac{\text{mm.}}{\text{sec.}}\right)=2f\left(\frac{1}{\text{sec.}}\right)\cdot r(\text{mm.})$$

in which S is the relative speed between the magnetizing and magnetizable elements, $f$ is the frequency of the exciting current, and $r$ is the spacing between two adjacent pole shoe sheets 11 and 13. If this speed is selected, the longitudinal dimension of each magnetized area will be the same as its transverse dimension, and a checkerboard pattern of substantially square areas of opposite magnetic polarity will be obtained.

If there is no relative movement between the magnetizing and magnetizable elements, the alternating magnetic field will cause a continuous reversal of the polarity of the magnetized areas.

As explained above, the magnetic head is slanted to the horizontal surface of the record carrier 25, and defines an angle $\alpha$ with a plane perpendicular to the same, as shown in FIG. 1. Consequently, the slanted face on the right side of pole piece 21', which trails in the direction of movement of the record carrier 25 is inclined at the steeper angle to the surface of record carrier 25, than is the face on the left side of pole piece 21'. Consequently the effect of the changing polarity of pole shoe sheets 13 on the already magnetized areas of record carrier 25 is insufficient to erase the just-formed magnetized areas, and the newly magnetized portions of record carrier 25 move rapidly out of the magnetic field. The portions of record carrier 25 moving under lower pole shoe sheets 11 are repeatedly magnetized in one polarity and then again magnetized in the opposite polarity so that the final polarity is determined in the region of the edge 22 and then maintained due to the steeper position of pole shoe sheets 13. The optimal angle between the trailing face of pole piece 21' and the surface of record carrier 25 would be 90°, but this angle cannot be obtained since a certain distance between the legs of core 5 must be maintained to provide space for the windings 5 and 6. The slant of the magnetic head cannot exceed a certain angle since the main direction of the magnetic field represented by the arrow B through which the plane of symmetry of the magnetic head passes, should not define too small an angle with the surface of the record carrier. The most favorable angle depends on a given flux density at the area of magnetization, on the permeability of the record carrier and of supporting table 26, and on the desired pitch and spacing of the magnetized areas, but can be found without difficulties by testing the device at different inclinations of the magnetic head.

The total magnetic flux, which is determined by suitable selection of the ampere turns of windings 5 and 6, is preferably selected so that the narrower reduced portions of pole shoe sheets 11 and 13 in the region of the overlapping area 23, slightly exceed the saturation magnetization of the material used for pole shoe sheets 11 and 13.

Figure 4:
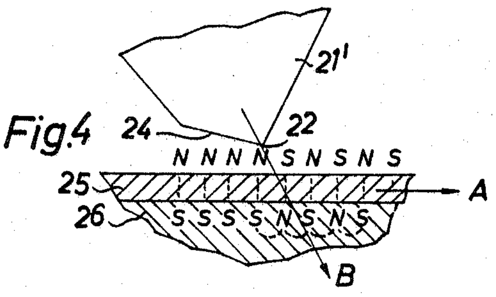
FIG. 4 is a fragmentary elevation, partially in section, illustrating a detail of a modified embodiment.

Instead of slanting the magnetic head, or in addition thereto, the leading face of pole piece 21' may be provided with a differently slanted surface 24, as shown in FIG. 4.

It is important that the edge formed by tips 22 is sharp, and that the trailing face of pole piece 21' is steeply inclined to the record carrier 25 so that sharply defined magnetic fields are created. In the event that the magnetic field would not be sharply limited, the newly magnetized areas of the record carrier would be demagnetized by the alternating magnetic field, although the effect of the same is gradually weakened as the magnetized areas move away from the magnetic head.

It will be understood that each of the elements described above, or two or more together, may also find a useful application in other types of magnetizing apparatus differing from the types described above.

While the invention has been illustrated and described as embodied in a magnetizing apparatus including a magnetizing and a magnetizable element movable relative to each other for forming a checkerboard pattern of areas of opposite magnetic polarity, it is not intended to be limited to the details shown, since various modifications and structural changes may be made without departing in any way from the spirit of the present invention.

What is claimed as new and desired to be secured by Letters Patent is:

1. Magnetizing apparatus for forming a pattern of alternate polarity, comprising, in combination, at least one magnetizing element having a pole piece with a tip; supporting means for supporting a magnetizable element in the proximity of said tip; energizing means for producing an alternating magnetic polarity in said pole piece at a predetermined frequency so that an alternating magnetic flux flows from said tip into said magnetizable element; transporting means for moving one of said elements in one direction relative to the other element at a speed dependent on said frequency in such a manner that at each change of the polarity of said pole piece a different area of said magnetizable element is located in the region of said tip and is permeated by the flux and magnetized so that magnetic areas of alternate polarity are created in said magnetizable element, said pole piece including a set of pairs of pole shoes arranged in a row transverse to said one direction, the pole shoes of each pair being spaced from each other in the transverse direction of said row and having opposite magnetic polarity so that magnetic fluxes flow in said transverse direction between said pole shoes of said pairs and through said magnetizable element and create in the same magnetic areas whose polarities alternate in said transverse direction, said pole shoes of each pair having overlapping end portions forming on said tip a sharp edge extending in said transverse direction, said pole shoes of each pair being slanted to a plane of symmetry and having inner edges defining an angle of at least 60° with each other, and having cross-sections reduced toward the ends thereof so as to be highly saturated in the region of said edge, said pole piece including separating sheets between the pole shoes of each pair consisting of a magnetically nonpermeable material, and inserted sheets consisting of a magnetically nonpermeable material located between successive separating sheets in the plane of said pole shoes, said pole shoes being sheets of the same thickness as said inserted sheets; said pole shoe sheets, said inserted sheet, and said separating sheets having such an outline as to form a solid pole piece having two planar faces intersecting in said sharp edge.

2. A magnetizing apparatus according to claim 1 wherein said magnetizing element includes a U-shaped core having leg portions magnetically connected with said pole shoes of said pairs, and windings on said core; and wherein said core and said pole piece have a plane of symmetry slanted to the surface of said supporting means and of said magnetizable element so that the face of said pole piece trailing in the direction of relative movement is more steeply inclined to said surface of said magnetizable element than the leading face of said pole piece.

References Cited

UNITED STATES PATENTS

| | | | |
|---|---|---|---|
| 2,522,463 | 9/1950 | Potts | 346—74 |
| 2,662,120 | 12/1953 | Anderson | 179—100.2 |
| 2,897,286 | 7/1959 | Atkinson | 179—100.2 |
| 2,958,568 | 11/1960 | Hagelbarger | 346—74 |
| 3,012,232 | 12/1961 | Eckert | 346—74 |
| 3,230,516 | 1/1966 | Neergaard | 346—74 |

OTHER REFERENCES

D. H. McClung: IBM Technical Disclosure Bulletin, January 1966, vol. 8, No. 8.

BERNARD KONICK, *Primary Examiner.*

LEE J. SCHROEDER, *Assistant Examiner.*

U.S. Cl. X.R.

179—100.2; 340—174.1; 346—74